(12) United States Patent
Frederick

(10) Patent No.: US 11,752,555 B1
(45) Date of Patent: Sep. 12, 2023

(54) METHOD FOR MAKING A RADIATION SHIELD USING FUSED FILAMENT DEPOSITION

(71) Applicant: EAGLE TECHNOLOGY, LLC, Melbourne, FL (US)

(72) Inventor: Stephen J. Frederick, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/820,905

(22) Filed: Aug. 19, 2022

Related U.S. Application Data

(63) Continuation-in-part of application No. 16/842,936, filed on Apr. 8, 2020, now abandoned.

(51) Int. Cl.
*B22F 10/22* (2021.01)
*B33Y 10/00* (2015.01)
*B22F 5/10* (2006.01)

(52) U.S. Cl.
CPC ............... *B22F 10/22* (2021.01); *B22F 5/10* (2013.01); *B33Y 10/00* (2014.12); *Y10T 29/496* (2015.01)

(58) Field of Classification Search
CPC .................................................. Y10T 29/496
See application file for complete search history.

(56) References Cited

U.S. PATENT DOCUMENTS

| | | |
|---|---|---|
| 6,524,522 B2 | 2/2003 | Vaidyanathan et al. |
| 8,105,696 B2 | 1/2012 | Rabiei |
| 8,110,143 B2 | 2/2012 | Rabiei |
| 9,208,912 B2 | 12/2015 | Rabiei |
| 9,993,341 B2 | 6/2018 | Vanasse et al. |
| 10,161,025 B2 | 12/2018 | Poole et al. |
| 11,135,763 B2 | 10/2021 | Beyerle et al. |
| 11,173,545 B2 | 11/2021 | Qi et al. |
| 2005/0260093 A1 | 11/2005 | Artz et al. |
| 2016/0263823 A1 | 9/2016 | Espiau et al. |
| 2017/0184108 A1 | 6/2017 | Scancarello et al. |
| 2019/0247050 A1 | 8/2019 | Goldsmith |
| 2020/0004225 A1 | 1/2020 | Buller et al. |

(Continued)

FOREIGN PATENT DOCUMENTS

| | | |
|---|---|---|
| CN | 109513906 | 3/2019 |
| CN | 106702357 | 8/2019 |
| EP | 3403806 | 11/2018 |

OTHER PUBLICATIONS

Matt Shipman: "Study Finds Metal Foams Capable of Shielding X-rays, Gamma Rays, Neutron Radiation," NC State University News; Research and Innovation; retrieved from https://news.ncsu.edu/2015/07/rabiei-foam-rays-2015/; Jul. 17, 2015, pp. 1-4. See Priority U.S. Appl. No. 16/842,936, filed Apr. 8, 2020.

(Continued)

*Primary Examiner* — Sarang Afzali
(74) *Attorney, Agent, or Firm* — ALLEN, DYER, DOPPELT, + GILCHRIST, P.A.

(57) ABSTRACT

A method for making a radiation shield includes generating a three-dimensional (3D) model for a metal body to serve as a radiation shield based upon a predetermined radiation stopping thickness for the metal and a predetermined strength based upon the metal and a pattern of voids therein. The method includes performing fused filament deposition to create the metal body having the pattern of voids therein.

23 Claims, 9 Drawing Sheets

(56) References Cited

U.S. PATENT DOCUMENTS

2020/0016584 A1 1/2020 Groeneveld et al.
2020/0024394 A1 1/2020 Hanson et al.
2021/0146603 A1 5/2021 Raeker et al.

OTHER PUBLICATIONS

John Banhart: "Manufacturing Routes for Metallic Foams," JOM, 52 (12), Solidification Science: Overview; retried from https://www.tms.org/pubs/journals/JOM/0012/Banhart-0012.html; (2000), pp. 22-27. See Priority U.S. Appl. No. 16/842,936, filed Apr. 8, 2020.

Wikipedia: "Metal Foam," retrieved from https://en.wikipedia.org/w/index.php?title=Metal_foam&oldid=941467420 Feb. 2020, 10 pages. See Priority U.S. Appl. No. 16/842,936, filed Apr. 8, 2020.

Belinda Smith: "Composite Metal Foams Shield Against Bullets, Radiation and Heat," Cosmos Magazine, retrieved from https://cosmosmagazine.com/technology/metal-foams-shield-against-bullets-radiation-and-heat, Apr. 18, 2016, 4 pages. See Priority U.S. Appl. No. 16/842,936, filed Apr. 8, 2020.

Maiti et al: "3D Printed Cellular Solid Outperforms Traditional Stochastic Foam in Long-Term Mechanical Response," Scientific Reports, Apr. 27, 2016, pp. 1-9. See Priority U.S. Appl. No. 16/842,936, filed Apr. 8, 2020.

Banhart et al.: "Production Methods For Metallic Foams," DOI: 10.1557/PROC-521-121, ISBN: 0272-91721-55899-427-0, Mat. Res. Soc. Symp. Proc. vol. 521,1998, pp. 121-132. See Priority U.S. Appl. No. 16/842,936, filed Apr. 8, 2020.

Chen et al., "Attenuation Efficiency of X-Ray and Comparison to Gamma Ray and Neutrons in Composite Metal Foams," Radiation, Physics and Chemistry, vol. 117; Dec. 2015; pp. 12-22. See Priority U.S. Appl. No. 16/842,936, filed Apr. 8, 2020.

McBlief, "Researchers Show That Metal Foam Can Block Radiation," Spring/Summer 2016, North Carolina State Engineering Magazine; Mar. 1, 2016; 2 pages. See Priority U.S. Appl. No. 16/842,936, filed Apr. 8, 2020.

Shipman, "Metal Foam Obliterates Bullets—and That's Just the Beginning," North Carolina State News 2016; Apr. 5, 2016; 1 page. See Priority U.S. Appl. No. 16/842,936, filed Apr. 8, 2020.

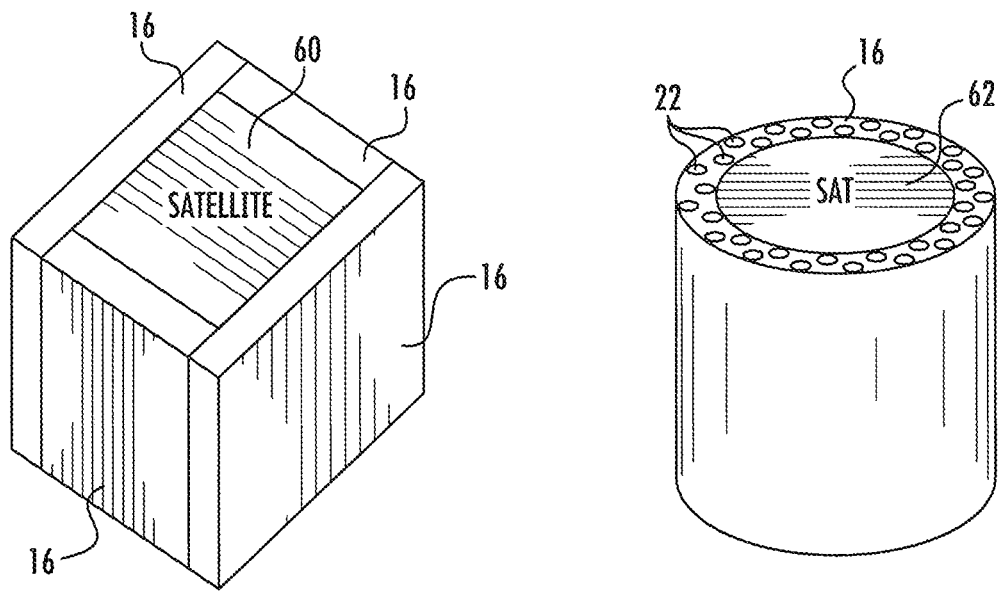
FIG. 6
FIG. 7
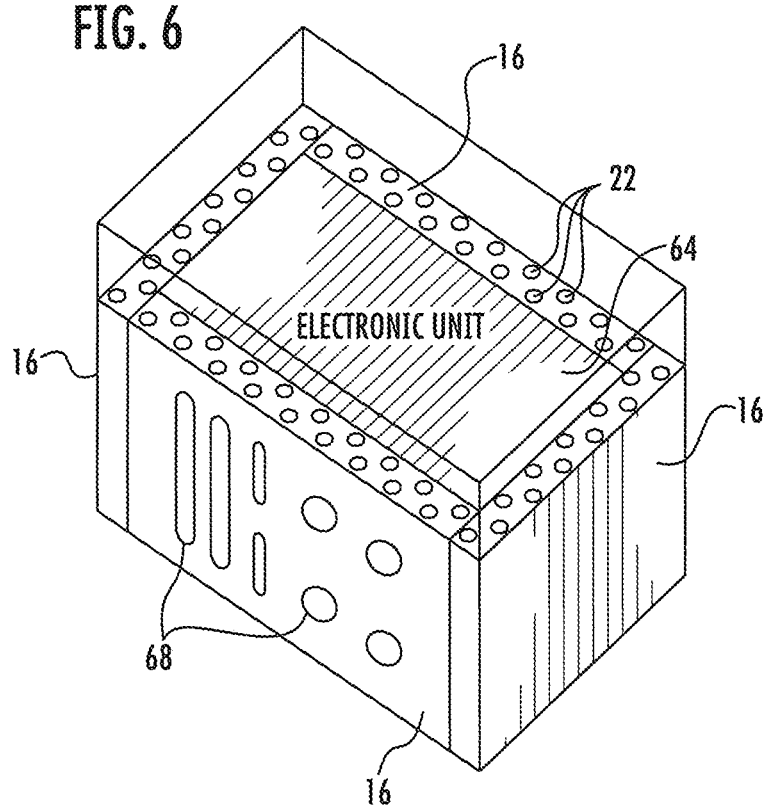
FIG. 8

MASS ATTENUATION COEFFICIENTS (cm²/g)

X-RAY 100kVp

| | Actual | Theoretical |
|---|---|---|
| (2mm sphere) S-S CMF | 0.4053±0.0059 | 0.3477 |
| (2mm sphere) Al-S CMF | 0.2089±0.0024 | 0.2498 |
| (4mm sphere) S-S CMF | 0.4044±0.0084 | 0.3474 |
| (4mm sphere) HZ S-S CMF | 0.9517±0.0090 | 0.9416 |
| (4mm sphere) Al-S CMF | 0.2081±0.0023 | 0.2503 |
| (5.2mm sphere) S-S CMF | 0.4044±0.0027 | 0.3474 |
| (5.2mm sphere) Al-S CMF | 0.2081±0.0025 | 0.2499 |
| Aluminum A356 | 0.1494±0.0062 | 0.1572 |
| Lead | 4.985±0.0016 | 5.336 |

FIG. 9

MASS ATTENUATION COEFFICIENTS (cm²/g)
Column "a" - Actual Values from Experiment
Column "b" - Theoretical Values

| | a | b | a | b | a | b | a | b | a | b | a | b |
|---|---|---|---|---|---|---|---|---|---|---|---|---|
| (2mm sphere) S-S CMF | 0.0524± 0.0038 | 0.0516 | 0.0525± 0.0035 | 0.0550 | 0.0806 ±0.0025 | 0.0726 | 0.0909± 0.0024 | 0.0969 | 0.4083± 0.0059 | 0.5486 | 0.9195± 0.0062 | 1.1700 |
| (2mm sphere) Al-S CMF | 0.0481± 0.0041 | 0.0525 | 0.0561± 0.0035 | 0.0559 | 0.0779 ±0.0025 | 0.0736 | 0.0874± 0.0025 | 0.0967 | 0.3240± 0.0084 | 0.3599 | 0.7112± 0.0024 | 0.6957 |
| (4mm sphere) S-S CMF | 0.0524± 0.0038 | 0.0516 | 0.0525± 0.0035 | 0.0550 | 0.0806 ±0.0025 | 0.0726 | 0.0949± 0.0016 | 0.0969 | 0.4063± 0.0054 | 0.5480 | 0.9195± 0.0062 | 1.1680 |
| (4mm sphere) HZ S-S CMF | 0.0525± 0.0043 | 0.0516 | 0.0552± 0.0063 | 0.0551 | 0.0738 ±0.0025 | 0.0738 | 0.1054± 0.0063 | 0.1043 | 0.8994± 0.0436 | 0.9663 | 1.1414± 0.0035 | 1.2690 |
| (4mm sphere) Al-S CMF | 0.0481± 0.0041 | 0.0525 | 0.0561± 0.0035 | 0.0559 | 0.0779 ±0.0025 | 0.0736 | 0.0908± 0.0023 | 0.0967 | 0.3142± 0.0051 | 0.3591 | 0.7112± 0.0024 | 0.6937 |
| (5.2mm sphere) S-S CMF | 0.0524± 0.0038 | 0.0516 | 0.0525± 0.0035 | 0.0550 | 0.0806 ±0.0025 | 0.0726 | 0.0891± 0.0015 | 0.0969 | 0.4110± 0.0090 | 0.5480 | 0.9195± 0.0062 | 1.1690 |
| (5.2mm sphere) Al-S CMF | 0.0481± 0.0041 | 0.0525 | 0.0561± 0.0035 | 0.0559 | 0.0779 ±0.0025 | 0.0736 | 0.0889± 0.0027 | 0.0967 | 0.3359± 0.0055 | 0.3592 | 0.7112± 0.0024 | 0.6940 |
| Aluminum A356 | 0.0489± 0.0036 | 0.0532 | 0.0549± 0.0029 | 0.0568 | 0.0733 ±0.0025 | 0.0745 | 0.0910± 0.0024 | 0.0964 | 0.1651± 0.0045 | 0.1848 | 0.2773± 0.0023 | 0.2556 |
| | $^{60}$Co 1.332 MeV | | $^{60}$Co 1.173 MeV | | $^{137}$Cs 0.662 MeV | | $^{133}$Ba 0.356 MeV | | $^{133}$Ba 0.081 MeV | | $^{241}$Am 0.060 MeV | |

FIG. 10

METHOD FOR MAKING A RADIATION SHIELD USING FUSED FILAMENT DEPOSITION

PRIORITY APPLICATION(S)

This is a continuation-in-part application based upon U.S. patent application Ser. No. 16/842,936 filed Apr. 8, 2020, (now abandoned), the disclosure which is hereby incorporated by reference in its entirety.

FIELD OF THE INVENTION

The present invention relates to the field of radiation shields, and, more particularly, to methods for making radiation shields.

BACKGROUND OF THE INVENTION

Metal foams are used in many applications because they have low density and high strength, and generally are formed as a metal body having a high porosity with about 5-25 percent of the volume being the base metal. Metal foams offer mechanical, thermal, electrical, and acoustic properties that make them advantageous for sound, heat and radiation absorption, damping applications, and use in medical devices and implants.

Metal foams can be formed from different manufacturing processes. For example, metal powders may be compressed to form a metal matrix. The metal matrix may be advanced as a filament above the solidus temperature of the metal matrix and the decomposition temperature of a blowing agent, to generate a gas within the metal matrix that forms a self-expanding foam. In a similar process, gases are dissolved or injected into metal melts. These processes do not always produce uniform results because of the constant injection of gas and its adverse effects on the final product.

In yet another well-known process, such as described in U.S. Pat. No. 8,110,143, a composite metal foam is prepared by placing prefabricated hollow metallic spheres in a mold and filling the spaces between the spheres with a matrix-forming metal powder, which is heated to a sintering temperature that is greater than the solidus temperature and less than the liquidus temperature of the metal powder to form the composite metal foam. That process is usually carried out in a closed mold system without application of pressure, such that the thermal expansion of the spheres during sintering localizes pressure around the spheres to facilitate pressing of the powder into the interstitial spaces. The results of this process, however, are not always optimal because the internal spheres have to be supported in the mold before the matrix-forming metal powder is inserted within the mold. As a result, not only must the supports be accounted for and removed from the final product, but the spheres may move within the closed mold either before or during the molding process, thus impacting the quality and strength of the final metal foam.

With the advent of additive manufacturing such as fused filament deposition, more precise metal foam articles can be made for applications, such as medical devices and medical implants, which demand high precision and quality, since greater control may be maintained over the manufacturing process. An example is the medical implant described in U.S. Pat. No. 9,993,341, which discloses an additively manufactured medical implant that may include at least one porous surface to promote bony on-growth or in-growth of tissue. The porous surface may be replicated from a high resolution scan of bone to generate a three-dimensional model of the bone. The additive manufacturing process may include direct metal laser sintering, electron beam melting, selective laser sintering, fused deposition modeling, and similar additive manufacturing techniques to create a metal foam body as a medical implant having a porous region that promotes bony on-growth or in-growth of tissue.

Some researchers have discovered that metal foams make promising radiation shields. Experiments have been conducted using metal foams produced using hollow spheres that have been fixed within a closed mold and embedded within a metallic matrix. Examples include steel-steel composite metal foams that attenuate radiation and they have been compared to pure lead shields. Researchers have found that the thickness of the fabricated metal foam, the relative positioning of the balls to each other, their diameter, and total number impact the effectiveness and strength of the radiation shield and its radiation stopping thickness. However, the drawbacks associated with that manufacturing process still exist because the spheres may not always be properly positioned, and inaccuracies occur in the manufacturing process. As the metal body forming the metal foam increases in size, which may be necessary for some radiation shields, the inaccuracies in the process increase, resulting in a less than desirable final product.

SUMMARY OF THE INVENTION

In general, a method for making a radiation shield may include generating a three-dimensional (3D) model for a metal body to serve as a radiation shield based upon a predetermined radiation stopping thickness for the metal and a predetermined strength based upon the metal and a pattern of voids therein. The method includes performing fused filament deposition to create the metal body having the pattern of voids therein.

In some embodiments, the pattern of voids may be in a repeating pattern. In other embodiments, the pattern of voids may be in a random pattern. Each of the voids may be in a spherical shape, for example. In an example, the spherically shaped voids may have a spherical shape with a same size, and in another example, the spherically shaped voids may have diameters in a range of 0.1 to 5 mm. The predetermined strength may comprise a predetermined bending strength. The metal body may comprise at least one of steel, aluminum, titanium, and tungsten, for example. The metal body may be advantageously devoid of lead in some embodiments.

BRIEF DESCRIPTION OF THE DRAWINGS

Other objects, features and advantages of the present invention will become apparent from the detailed description of the invention which follows, when considered in light of the accompanying drawings in which:

FIG. 6 is a diagram of an example of four radiation shields configured in a cubic structure for a satellite.

FIG. 7 is a diagram of another example of the radiation shield configured in an annular configuration for a satellite.

FIG. 8 is a diagram of another example of radiation shields configured in a cubic structure used for electronic unit shielding.

FIG. 9 is a chart of mass attenuation coefficients ($cm^2/g$) for different composite metal forms.

FIG. 10 is another chart of mass attenuation coefficients comparing actual to theoretical values for different composite metal foams.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
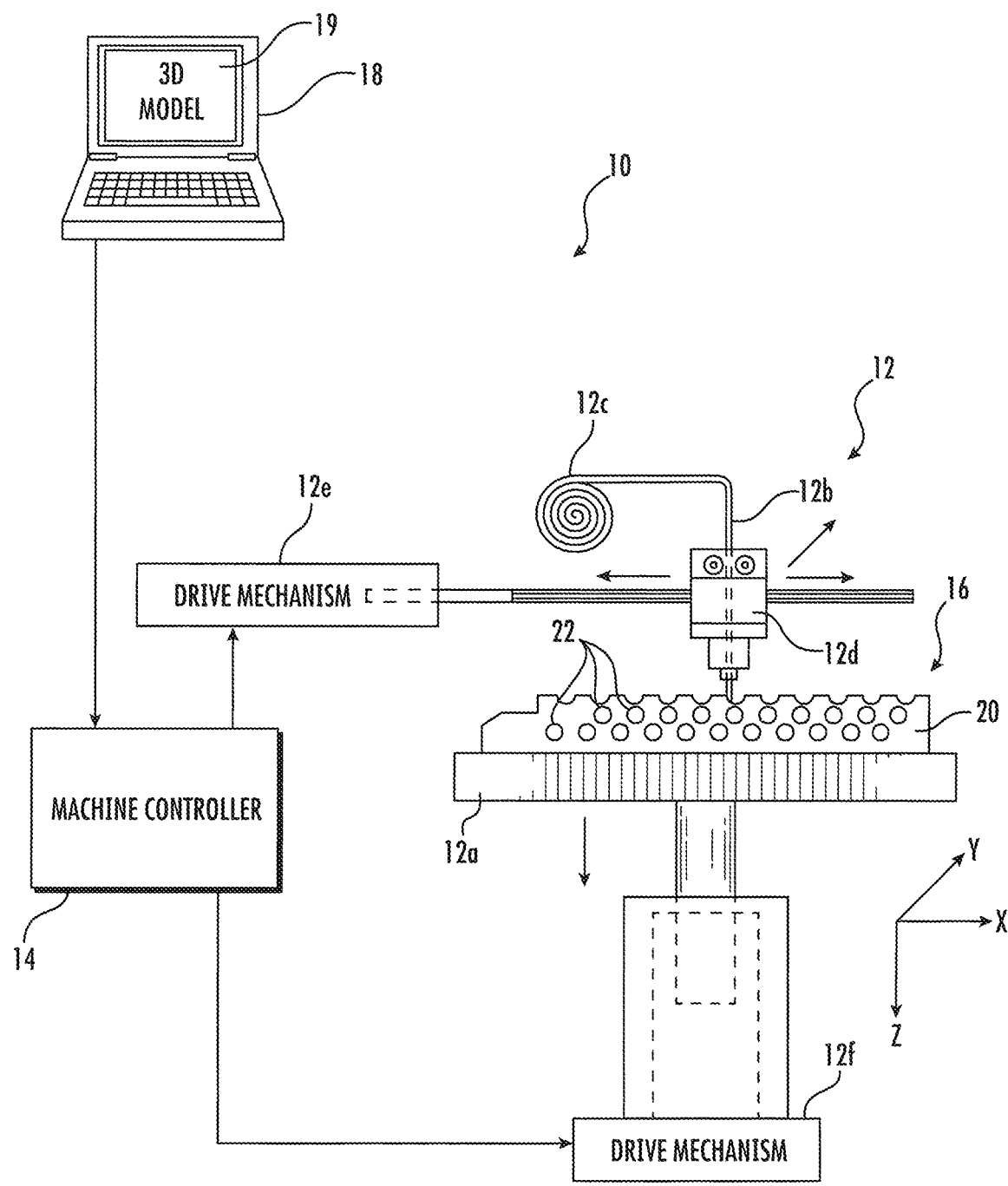
FIG. 1 is a block diagram showing components used in the process for making the radiation shield having a pattern of voids in accordance with a non-limiting example.

Referring initially to FIG. 1, a system for making a radiation shield in accordance with a non-limiting example is illustrated generally at 10 and includes a fused filament deposition machine 12 and a machine controller 14 that converts a 3D model into instructions to operate the fused filament deposition machine and form a radiation shield 16 by performing fused filament deposition. The machine controller 14 could be an integral part of the fused filament deposition machine, or a networked server or stand-alone computer or similar processing device, which receives the 3D model from another controller or processor on which the 3D model had been generated, such as the illustrated laptop computer 18, in which a three-dimensional (3D) model 19 has been generated for the metal body 20 that serves as the radiation shield 16 based upon a predetermined radiation stopping thickness for the metal and a predetermined strength based upon the metal and a pattern of voids 22 therein. The predetermined strength includes additional mechanical properties that are tailorable, such as mass, strength, and torsion. Additionally, with the predetermined strength, there are included thermal properties that are tailorable, which are advantageous for spacecraft, avionics, and electronics design. The fused filament deposition machine 12 makes the radiation shield 16 by building up the layers of the metal body 20 having the pattern of voids 22 therein in accordance with the generated 3D model 19. The 3D model 19 serves as the framework for producing the radiation shield 16. The machine controller 14 converts the 3D model 19 into machine instructions for controlling the fused filament deposition machine 12 to make the radiation shield 16.

Different types fused filament deposition machines 12 may be used for producing the radiation shield 16. Usually, fused filament deposition machines 12 include a vertically movable support or build table 12a on which the object, such as the illustrated radiation shield 16 is built by depositing successive layers of metal filament 12b that is fed from a supply roll 12c, into a heated nozzle assembly 12d, which deposits the metal material onto the object being built, in this case, the radiation shield 16. The heated nozzle assembly 12d moves in the X-Y directions via a first drive mechanism 12e that receives instructions for movement from the machine controller 14. The vertically movable (Z-direction) build table 12a likewise is connected to a second drive mechanism 12f, which receives instructions from the machine controller 14 to lower the build table 12a during the build process as successive layers of metal are deposited.

The processing to form the voids 22 in the radiation shield 16 may be optimized when generating the 3D model 19 using a 3D modeling program known to those skilled in the art, for example, using a commercial AutoCAD or similar 3D modeling program. Example programs for optimizing voids, such as spherical and similar shapes in 3D models include 3D modeling programs that provide stochastic/randomized distribution of voids and particles, including spheres having predefined properties of size, density and randomness. These software programs leverage 3D modeling tool particle plug-ins that can be applied to some conventional CAD programs. An example is a Blender modeling tool as an open source 3D creation pipeline that generates distributed spheres in a predefined model or box. Another example is the KeyShot modeling tool that generates random bubbles, such a single size spheres and multiple size spheres in a predefined model. KeyShot is a stand-alone, real-time ray tracing and global illumination program that creates 2D renderings. An Autodesk program, also known as a 3D Studio Max, may include a MassFx plug-in that permits the program to fill an object with predefined spheres in a randomized or repeated pattern that fits inside the object.

Other types of programs may process instructions input from a user to define a distribution of particles and/or spheres with predefined properties to leverage the close-packing of equal sphere modeling tools. The processing may optimize via appropriate modeling algorithms may import as the equal distribution of spheres with predefined properties of size and distance between the spheres. An example is a program that generates a 3D model for Face Centered Cubic (FCC) lattices, also known as cubic closed pack, and Hexagonal Close-Packed (HCP) lattices as used in three-dimensional software modeling.

Existing software such as LISP is a well-known code that may operate in conjunction with Autodesk computer-aided drafting (CAD) products. A CAD model may be drafted and the user may leverage the uniform distribution of voids and spheres, such as using an array distribution, manual placement, distribution algorithms and modeling plug-ins. A particle flow code, such as PFC Itasca, may be used to 3D model uniform distribution of set sphere diameters in an Autodesk platform.

These 3D modeling techniques described above may be employed by a user or programmer to generate the 3D model 19 for the metal body 20 and produce the radiation shield 16 based upon a predetermined radiation stopping thickness for the metal and a predetermined strength based upon the metal and a pattern of voids 22 therein. Once the 3D model 19 is generated within the machine controller 14 and it is programed to input the converted control commands to operate the fused filament deposition machine 12, the metal body 20 is formed having the pattern of voids 22 therein in accordance with the 3D model 19 as generated. The fused filament deposition machine 12 enables the printing of material, such as the metal used for the metal body 20, around defined cavities or voids in the metal or similar material based on the 3D model 19 geometry. The voids 22 may be specified in the 3D model 19 to produce a pattern of voids in a repeating pattern illustrated generally at 24 (FIG. 3) or the voids 22' may be in a random pattern illustrated generally at 26' (FIG. 4). The voids 22, 22' preferably have a spherical shape, which may ease fabrication complexity of the radiation shield 16 and be more conducive for the fused filament deposition process. The spheres may have a spherical shape with the same size or different sizes. Other void shapes may be produced besides the illustrated spherical shape depending on the design of the radiation shield.

The fused filament deposition process can be used to create a standard in-fill pattern using 3D printing slicing engines and operate as a tool with appropriate processing where the fused filament deposition machine 12 cuts the 3D model 19 into two dimensional layer code used by the fused filament deposition machine during the manufacturing process. The machine controller 14 may operate with the fused filament deposition machine 12 and process a CAD file using, as an example, Insight™ or a Grab CAD Print™ or similar software programs. This type of program allows a user to select build parameters, including slice height, in-fill patterns, and part orientation, and provide the capability for part customization.

Many fused filament deposition machines 12, such as the type described with reference to FIG. 1, are capable of dispensing one or two different materials during the printing process, such as a primary model material that makes up the final geometry, and in some cases, a secondary support material used to support material overhangs during future deposition layers. With use of selected temperatures, feed speeds, and pressures and the associated selection of the metal material used for the radiation shield 16, however, it may not be necessary to employ a secondary support material, and the filament deposition process may create the metal body 20 having the pattern of voids 22 therein using a single extrusion material. In some examples, and depending on the selected metal material, it is possible to include laser sintering as an added process component to aid in the deposition of material.

Figure 2:
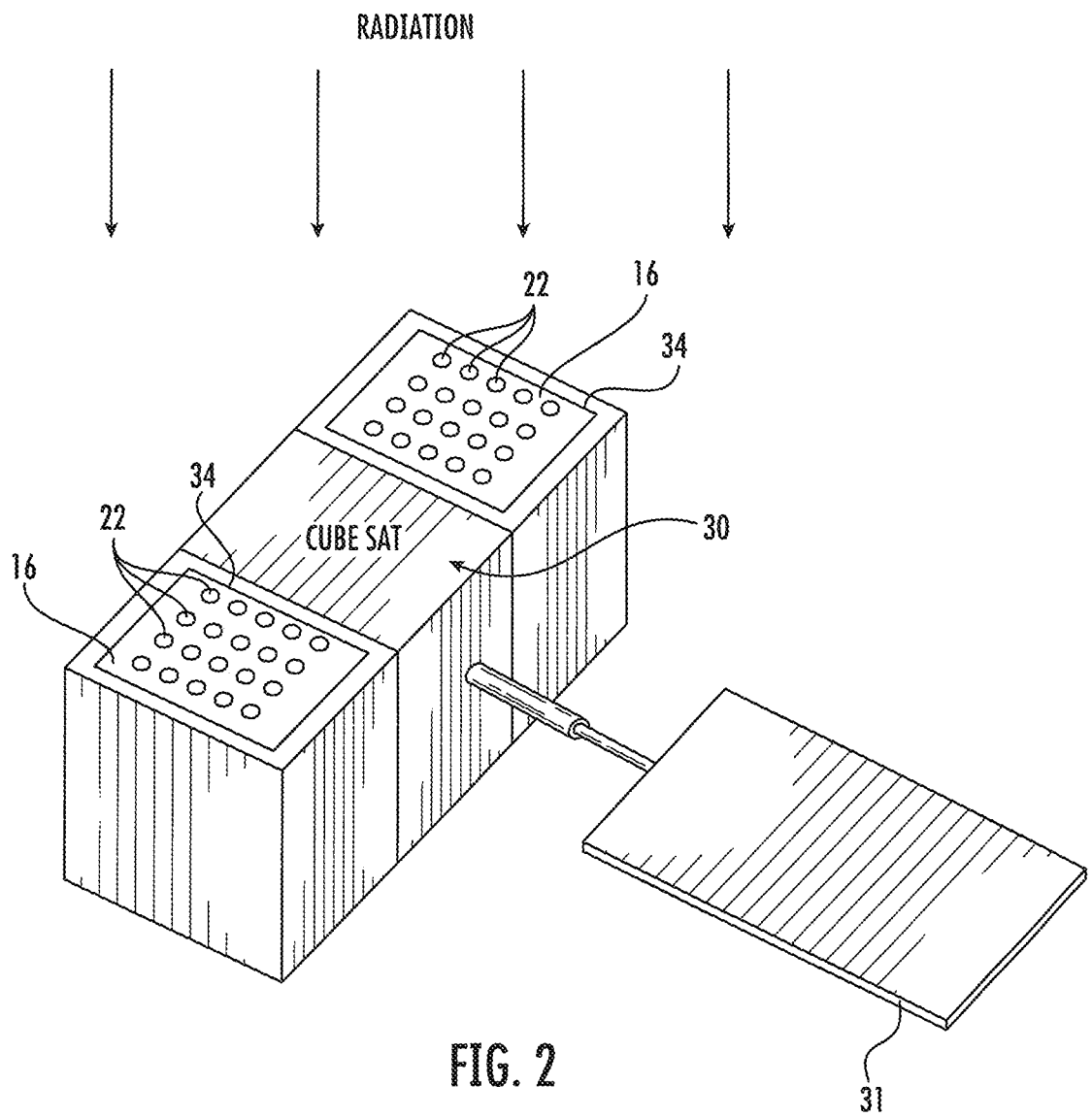
FIG. 2 is a diagram of an example of the radiation shield made by the process of FIG. 1 and used in a satellite.

Referring now to FIG. 2, there is shown an example of the manufactured radiation shield 16 used in this example as an access panel into a CubeSat 30 with its solar panel 31 to protect electronic components contained in the CubeSat from a radiation source, such as gamma radiation from the sun, including cosmic radiation, or other forms of radiation. The radiation shield 16 may be tailored to a specific type of radiation and it can shield from several types of radiation. The radiation shield 16 is not limited to Cubesats, but can be applied to larger satellites, such as illustrated and explained below with reference to FIGS. 6 and 7, and also used with other structures to form a support structure, such as an electronic unit shielding. The radiation shield 16 provides a lightweight but strong material as a metal foam material, which is advantageous in the CubeSat 30 or other satellite or unit shielding application. The radiation shield 16 may be designed based upon a predetermined radiation stopping thickness for the metal and a predetermined strength based upon the metal, which as explained above includes tailorable mass, strength, torsion, and thermal properties. This predetermined strength may include a predetermined bending strength, which may be desirable to ensure there is sufficient rigidity and strength for structural applications, such as the illustrated access panel on the CubeSat 30. The overall thickness of the metal body 20 helps set the gamma stopping power of the radiation shield 16. Also, the thicker the metal body 20, the greater strength, while a reduced thickness will allow greater bending, which may be practical in some applications.

In other applications such as medical imaging, for example, the voids 22 and metal body 20 may be formed such that the radiation shield 16 may be resistant to certain x-rays. In the CubeSat 30 application such as shown in FIG. 2, however, the voids 22 and metal are formed for the particular application where the shielding is for radiation commonly occurring in space. In another example, the radiation shield 16 may include a section of the metal body 20 having fewer voids 22 or no voids. The radiation shield 16 may have an area of greater strength with fewer voids that operates as a bracket section 34, 34' (FIGS. 2, 3 and 4) to hold the radiation shield 16 onto a support of the satellite, while the section of the metal body 20 that has the selected number, pattern, size and shape of voids 22 serves as the radiation shield section to shield electronic components from the gamma or other radiation. The voids 22 may be selectively placed to provide radiation shielding in specific areas. For example, the radiation shield 16 may be placed over a specific piece of sensitive electronics or provide increased strength in a desired area.

Referring again to FIGS. 3 and 4, the radiation shield 16, 16' is illustrated in which a pattern of voids 22, 22' is in a repeating pattern 24 (FIG. 3) or a random pattern 26' (FIG. 4). It should be understood that some voids 22 may be in a repeating pattern 24 and other voids 22' may be in the random pattern 26' in the same metal body 20. It should also be understood that each of the voids 22, 22' may have a spherical shape as in the example of FIG. 3 and be of the same size diameter as illustrated, or as in the example of FIG. 4, the spherically shaped voids 22' may have different diameters. In the example of an application for a satellite, the voids 22 may range from 2 to 5 millimeters. That diameter range of 2 to 5 millimeters has been found advantageous for the radiation shield 16 in some outer space satellite applications to attenuate various x-ray, gamma ray, and neutrons, but in other applications, including some outer space applications, the diameter range may be 0.1 to 5 millimeters. These ranges are within the standard parameters for additive manufacturing and offer a wide range of options in regard to sphere diameter variability. The metal body 20 may be formed of different materials, including steel, aluminum, titanium, and tungsten. Other metallic materials may also be used. In an example, the metal body 20 is devoid of lead, thus lacking the poisonous attributes associated with lead. The absence of lead can be useful in some medical or other applications where the lead can have harmful effects. An additional method is where the metal body 20 is devoid of source material in the case of laser sintering where a powder is placed over the prior layer.

Figure 5:
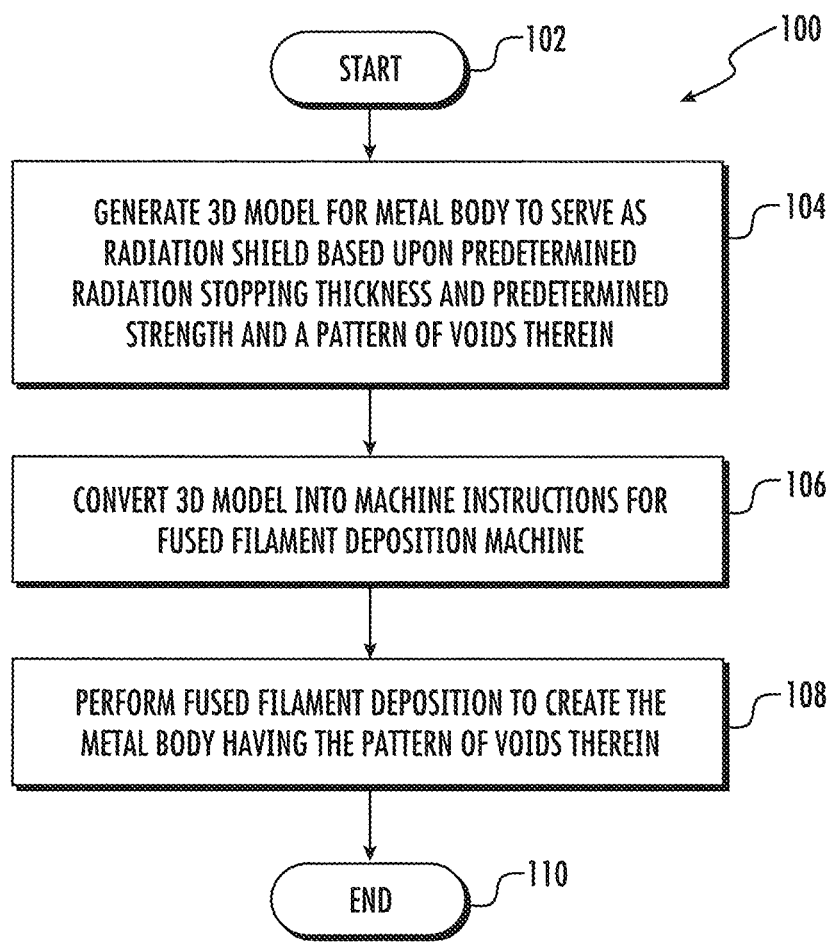
FIG. 5 is a flowchart showing an example of the process for making the radiation shield of FIG. 1.

Referring now to FIG. 5, there is illustrated an example of the method for making the radiation shield of FIG. 1 and illustrated generally at 100. The process starts (Block 102), and a three-dimensional (3D) model 19 is generated for a metal body to serve as a radiation shield (Block 104). This 3D model 19 is based upon a predetermined radiation stopping thickness for the metal and a predetermined strength based upon the metal and a pattern of voids 22 therein. The 3D model 19 is converted into machine instructions for the fused filament deposition machine 12 (Block 106). Fused filament deposition is performed to create the metal body 20 having the pattern of voids 22 therein (Block 108). The process ends (Block 110).

It should be understood that the radiation shield 16 may be used for many different purposes that require shielding from sources of radiation, including medical and outer space applications. The 3D model 19 for the metal body 20 serves to form the radiation shield 16 based upon a predetermined radiation stopping thickness for the metal and a predetermined strength based upon the metal and the pattern of voids 22 therein. The 3D modeling program and a user skilled in the use of the program and the fused filament deposition machine 19 may generate the 3D model to impart the desired radiation stopping thickness and predetermined strength where the pattern of voids can vary such that the radiation stopping ability and strength of the metal may vary depending on end use. The radiation shield 16 may also be designed as a lightweight CTE-tailored (Coefficient of Thermal Expansion) structure that could support electronic assemblies, or similar applications where CTE-matching and light weight are required for dimensional stability. In some specialized electronics such as phased array, focal plane electronics, ultra-optimized boxes and similar applications, the best stiffness and heat transfer may be acquired through rigid adhesive bonding to increase the area of the moment of inertia. A lightweight structural material such as aluminum has a large CTE differential, and when used in conjunction to a circuit board, this may lead to thermos-elastic distortion, which may not be allowable for some applications. Materials that match the circuit board CTE may be expensive, such as AlBeMET, or too heavy, e.g., copper and steel, or thermally inferior, such as some composites. Thus, by "foaming" copper or beryllium copper to be as light as aluminum on a bulk basis, a radiation shield and heatsink material may match the board CTE while being stiffer. It may be possible to print and bond together two layers or print with different metals in the same operation if a certain dimensional response is desired, such as in a bimetallic strip.

Referring now to FIG. 6, there are illustrated four radiation shields 16 forming a square or cubic configuration to form a box structure to protect a satellite illustrated generally at 60. There may also be top and bottom radiation shields 16 (not shown) to form a complete cubic structure. In this example and the examples of FIGS. 7 and 8 as described below, the voids 22 are shown in a repeating pattern and have about the same diameter, but could be in a random pattern and a different diameter.

FIG. 7 shows an annular configured radiation shield 16 that forms a support structure for a satellite 62 and showing the voids 22 in a repeating pattern. There may also be top and bottom circular configured radiation shields 16 (not shown) to close off the ends.

FIG. 8 shows another rectangular configured structure formed by four radiation shields 16 that support an electronic unit 64 and provide electronic unit shielding. Electronic external connectors 68 are illustrated and formed in one side of the structure. This structure may also include top and bottom radiation shields (not shown) to completely enclose the electronic unit 64. Many other configurations and structural units may be formed from the radiation shield 16 as required by those skilled in the art.

The process as described may be used to produce many different components, but is especially adapted for producing a radiation shield 16, such as used with satellites 60,62. The process generates the three-dimensional (3D) model 19 for metal body 20 components to serve as the radiation shield 16 based upon a predetermined radiation stopping thickness of the metal and a predetermined strength based upon the metal and a pattern of spherically shaped voids 22 therein. Fused filament deposition is employed with an extrusion material to create the metal body that as a portion may be formed as a composite metal foam (CSP) having the pattern of spherically shaped voids 22 therein.

These voids 22 may be formed throughout the metal body 20 in a first section that operates as the radiation shield 16 by extruding the extrusion material in successive layers to produce the spherically shaped voids having a predefined size, spacing and density, and the pattern of the spherically shaped voids relative to the thickness of the extrusion material and forming a CMF (composite metal foam). This CMF structure imparts the predetermined radiation stopping thickness and predetermined strength.

Figure 3:
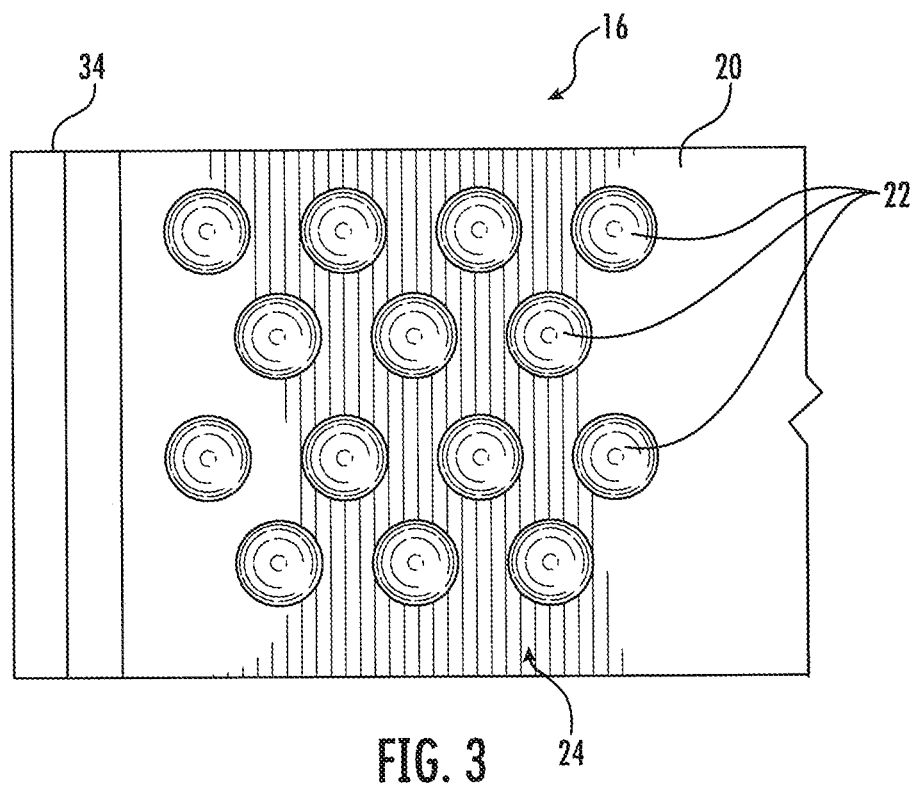
FIG. 3 is a plan view of the radiation shield made by the process of FIG. 1 and showing a pattern of voids in a repeating pattern.
Figure 4:
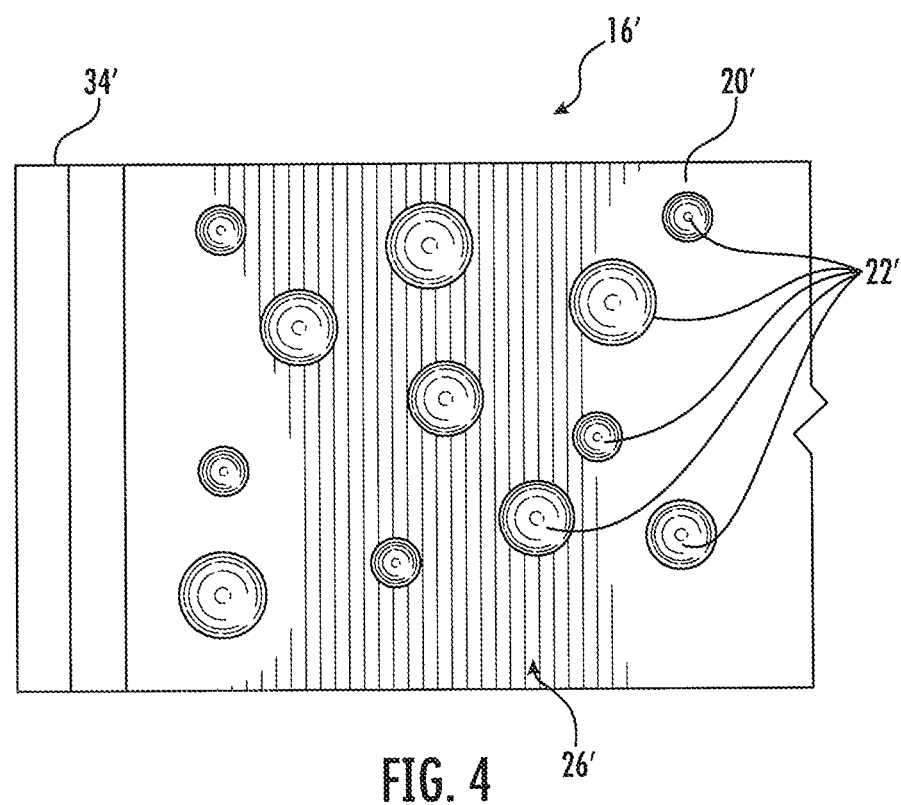
FIG. 4 is a plan view of the radiation shield made by the process of FIG. 1 and showing the pattern of voids in a random pattern.

The spherically shaped voids 22, 22' may be in a repeating pattern or random pattern as best shown in FIGS. 3 and 4. The spherically shaped voids 22, 22' may have the same size, and in an example, have diameters in the range of 0.1 to 5 millimeters. The metal body 20 may be devoid of lead and may be formed of lightweight aluminum or similar material and include additives, such as at least one of steel, aluminum, titanium, and tungsten, and include a predetermined bending strength.

As noted before, the radiation shield 16 produced using the process as described overcomes the problems associated with more conventional metal foams disclosed in the '143 and '341 patents, for example, such as metal powders that may be melted to form a metal matrix, which do not always produce uniform results. The radiation shield 16 produced using the process as described overcomes the problems associated with placing prefabricated hollow metallic spheres in a mold.

As noted before, it has been known to use metal foams having hollow spheres that are fixed within a closed mold and embedded with a metallic matrix, such as steel-steel composite metal foams that attenuate radiation similar in function to pure lead shields, but are much lighter and easier to produce. The spheres are positioned close to each other and their diameter and total number impact the effectiveness and strength of the radiation shield and its radiation stopping thickness. Problems occurred in manufacturing these radiation shields because the spheres were not always properly positioned, were difficult to position relative to each other, and were not accurately fitted within a mold. Inaccuracies also occurred in the manufacturing of the sphere with a less than desirable final product.

Reference is now made to the article by Chen et al., "Attenuation Efficiency of X-Ray and Comparison to Gamma Ray and Neutrons in Composite Metal Foams," Radiation, Physics and Chemistry; Volume 117; December 2015; pp. 12-22, the disclosure which is hereby incorporated by reference in its entirety. Composite metal foams had been tested using 2.0, 4.0, and 5.2 millimeter hollow spheres. Steel-steel composite metal foams (S-S CMF's) and aluminum-steel composite metal foams (AlS CMF's) with various sphere sizes and matrix materials may be used for the radiation shield. Examples of materials used for the CMF's include 316L stainless steel, high-speed T15 steel, and aluminum materials as a matrix material and 2 mm, 4 mm, and 5.2 mm steel hollow spheres. High-speed T15 steel has a high tungsten and vanadium concentration (both high-Z elements) and improves the shielding efficiency of CMF's. This metal is defined as a High-Z, steel-steel composite metal foam (HZ S-S CMF), and may be used to attenuate X-ray, gamma ray and neutrons.

Experiments have compared pure lead and aluminum A356, and verified theoretically that the radiation shielding effectiveness of CMF's is relatively independent of sphere sizes as long as the ratio of sphere wall thickness to its outer diameter stays constant. Thus, when generating the 3D model 19 for the metal body 20, one aspect in the computer aided design (CAD) program incorporated with the machine controller 14 explained below is to ensure that the ratio of sphere wall thickness is constant to its outer diameter.

Smaller spheres are generally more efficient because of the observed fine fluctuation in the gray value profile of their 2D MicroCT images. Steel-steel CMF's and Aluminum-steel CMF's 275% (S-S) and 145% (Al-S) were more effective in X-ray attenuation than aluminum A356. Compared to lead, these CMF's not only have excellent attenuation, but are lightweight and environmentally friendly. It was also determined that HZ S-S CMF's under quasi-static compression performed better than other classes of S-S CMF's because of the high-Z element inclusions, such as tungsten, vanadium, and similar composite or matrix materials.

It is possible to use T15 high-speed steel powder as a matrix that includes high-Z tungsten (about 12.5 weight percent) and vanadium (about 5.0 weight percent) to improve shielding against X-rays, low energy gamma rays, and neutrons. These materials have low density, high strength and high absorption. It has been determined that barium base materials may enhance radiation shielding properties.

Experiments had been conducted using six (6) different photon energies having nine (9) different examples of different sized materials and spheres showed that transmission decreased exponentially with increasing sample thickness. Higher energies in the transmission curves were overlapping.

For example, FIG. 9 is a table showing the mass attenuation coefficients ($cm^2/g$) with 100 kVp X-ray energy levels for different example sphere sizes, such as 2 mm, 4 mm, and 5.2 mm, and nine specific material examples showing the experimental and theoretical mass attenuation coefficients ($cm^2/g$) for the composite metal foams (first seven rows) and also for aluminum A356 and elemental lead, at an X-ray energy of 100 kVp. These values were established experimentally as a difference in potential applied to an X-ray tube, and thus, controlled the penetrating strength of an X-ray beam. The table in FIG. 9 shows the excellent attenuation coefficient for the 4 mm sphere HZ steel-steel (CS-S) composite metal foam (CMF) that was better than aluminum A356. It was found that the experimental and theoretical values are close as reflected in the table.

For a given area and density of shielding, the difference between sphere sizes on both Al-S and S-S CMF's is insignificant as long as the ratio of sphere-wall thickness (t) to its outer-diameter (R) stays constant. When creating the 3D model 19, this constraint is taken into consideration when inputting values to the CAD program as part of the machine controller 14 as explained below. The decrease in gamma ray attenuation by the air inside the spheres is balanced out by the increase in gamma ray attenuation by the sphere wall under the same t/R ratio. The smaller spheres are more efficient in general due to the fine fluctuation and homogeneity in the gray value profile shown in their 2D Micro-CT images.

An example of the mass attenuation coefficient for the nine samples at the six different photon energies are presented in the table of FIG. 10 and compared with the theoretical results as evidenced by Chen et al. These values are extrapolated in some examples when used in designing the radiation shield 16. For example, the thickness of the material, its designed area, density and volumetric density may be taken into consideration when generating the 3D model 19.

There are several inputs to determine the thickness of material required to provide sufficient radiation shielding. First, the radiation environment where the radiation shield 16 is required is selected. The radiation tables for both terrestrial and solar system environments are maintained and publicly available by NASA. For example, NASA maintains a page from the Radiation Effects and Analysis Group (REAG), which has tested and analyzed different terrestrial and solar system environments to investigate the effects of radiation on individual electronic components and circuits. For example, this type of information may be found at the website https://radhome.gsfc.nasa.gov. As a further example, for the radiation shield 16 of a satellite 60, the NASA/GSFC Radiation Effects and Analysis home page has different databases that include searchable lists of electronic devices and components, making it possible to know the type of electronic device and components that must be shielded. These radiation tables for both terrestrial and solar system environments are included as publicly available databases and could be automatically queried by the CAD program as various inputs are entered regarding the specific circuits and components to be shielded and the selected radiation environment.

Second, the object requiring shielding is assessed. Each vehicle, cargo, electronic assembly, or human payload has a characterized radiation tolerance level. These levels are also characterized and maintained in databases for public use by NASA. Different websites may include these databases of total radiation dosage characteristic tests for specific components. Depending on the type of equipment, overall circuits and individual electronic components in the vehicle, cargo, electronic assembly, or other payload, the different radiation tolerance levels may vary as determined from the website. Information may be solicited from the website, and the radiation shield 16 characteristics implemented when generating the three-dimensional (3D) model 19 and producing by fused filament deposition the metal body 20 that serves as the radiation shield 16 based upon a predetermined radiation stopping thickness for the metal. With such large electronic memory storage capacities for different machine controllers 14 for fused filament deposition machines 12, these databases may be stored in memory on site for local access.

Third, the profile of the object within the selected environment is captured. For example, the profile may be a series of metal body plates for shielding a satellite access openings of the metal body 20 of the satellite 60 itself. This allows identification and characterization of the radiation dose rates for a given period of time at specific environments, while leveraging the same NASA radiation tables, which as noted before, may be stored in the memory of the machine controller 14 and accessed locally. For example, these tables and associated databases indicate how much radiation shielding is required for aluminum alloys, and what levels are allowable over a specified timeframe. By determining the standard thicknesses of radiation shielding required from the information provided by NASA and its tables, it is possible to calculate the shielding thickness of the radiation shield 16 based upon a predetermined radiation stopping thickness for the metal and required to address the desired environment and radiation absorption required over time.

For example, the designer of the radiation shield 16 may apply the NASA radiation tables that specify the thickness of raw aluminum shielding. Once the thickness of the material is determined, such as for aluminum, the efficiency multiplier of the composite metal foams for varying spherical voids 22, such as described in Chen et al. and described in the tables of FIGS. 9 and 10, is applied to determine the thickness of the composite metal foam that will be 3D manufactured. Additional factors of safety may be applied to provide a margin of safety, which factors may depend on the type of equipment and electronics to be shielded, the type of satellite, the height and velocity of the satellite, and other factors.

Another technique may be used to perform a detailed analysis by simulation, where the CAD 3D model 19 for the radiation shield 16 is imported into radiation analysis and particle simulation tools for statistical modeling, utilizing thermal and mechanical material properties, which are characterized by testing and data sheets. These simulations are routinely used to estimate measurements for dosages experienced by electronics on satellites with shielding of various materials, material thicknesses, and material shapes. Simulations may be run to characterize the desired radiation shielding thickness and compared with empirical calculations.

In an example, a material and radiation shield 16 pattern is selected and the 3D model 19 generated. As noted before, selection of materials for the radiation shield 16 is routinely conducted based on the radiation qualification data available for each material and the electrical, mechanical, and thermal properties for the materials. As noted before, the databases to determine data about the radiation qualification are queried in an example. There may be a system level trade where: 1) the total mass of the material, 2) the electrical properties of the material, such as conductivity or resistivity, 3) the mechanical properties of the material, such as strength and elasticity, 4) the thermal properties of the material, such as emission, conduction, or insulation, and 5) the radiation properties of the material are compared to the total system value to select an optimal solution. Standard materials may be selected based upon current uses for a radiation shield 16, such as aluminum, which provides radiation shield 16 protection while offering a lower total mass versus an optimal radiation shield made from lead, for example. The materials typically used for a radiation shield 16 are standardized across the industry, and the final design and configuration for the radiation shield to be produced are taken into account.

To develop the pattern for the 3D model 19, the radiation shield 16 as the object being produced, such as an access plate for a satellite 60 body into which the electronics are held, is evaluated for the amount of required radiation shielding. Once the base thickness of the material is determined using the publicly available NASA tables, for example, or using material qualification data for composite metal foams, such as in the tables of FIGS. 9 and 10 and other similar tables, the sphere or void 22 density is selected to support the target application, i.e., electron, gamma ray, or X-ray mitigation. For example, the sphere or void 22 diameter may be adjusted upward from an initial 2 mm, increasing in size based on the application. The mathematical equations implemented in the CAD tool for the machine controller 14 optimize the mass density of the spheres or voids 22 using spherical lattice structures, and maximize weight reduction while increasing total surface area of spherical voids 22, while not compromising the mechanical properties of the material. For example, an example lattice structure for voids 22 to be produced is a binary sphere packing and lattice structure. However, different lattice structures may be selected and employed.

The 3D models 19 used to produce a specific radiation shield 16 may include a simple plate that forms the outside of an electronics enclosure in a satellite 60, a complex bracket, a complex three-dimensional plate having a shape that encapsulates the mounted microelectronics within the satellite housing, or an entire hull panel for spacecraft or solar arrays. The radiation analysis for the entire system may determine what radiation shield 16 is required and how much shielding should be used, so that the thickness and radiation shield location is tailored to each individual application. The CAD tool provided in the machine controller 14 may automatically determine the extrusion parameters of the material based on the radiation stopping thickness for the selected metal and the pattern of spherically shaped voids 22, such as described above. In an example, this information may also be extrapolated from Chen et al. or other data, such as the publicly available databases.

The variable sphere or void 22 spacing may be determined in an example using the common Computer Aided Design (CAD) drafting tool, such as the drafting tool from Parametric Technology Corporation (PTC) known as CREO Parametric. This type of CAD program is a high-level modeling system that uses parameters, dimensions, features, and relationships to capture intended model behavior and uses engineering constraints and relationships to optimize the 3D model 19 design. A complete 3D digital model of the radiation shield 16 to be manufactured may be created, and the 2D and 3D solid model data may be used downstream in a finite element analysis for rapid prototyping, tooling design, and additive manufacturing. Any math and images for the CAD drafting program may be generated based upon the end use application for the radiation shield 16 as noted above. The PTC CREO CAD drafting program may implement a predetermined thickness, material and strength of metal material, and pattern of spherically shaped voids 22, and generate the 3D model, which has tailored properties for a particular radiation shield 16.

An example of a manufactured baseline test article included:
 a) 2 mm diameter spheres;
 b) 1 mm sphere spacing; and
 c) a 150 mm by 150 mm rectangle with varying thicknesses.

For example, the varying thickness for the shield rectangle defining the radiation shield 16 included:
 i) 4 mm (contains 1 sphere layer);
 ii) 6.12 mm (contains 2 sphere layers);
 iii) 8.24 mm (contains 3 sphere layers);
 iv) 10.36 mm (contains 4 sphere layers); and
 v) 12.49 mm (contains 5 sphere layers).

The CAD process employed at the machine controller 14 used mathematical relations that are implemented in the CAD program, i.e., PTC CREO, and leveraged basic geometry, such as "sphere packing," and implemented geometrical mathematical equations for spacing of the spheres in a lattice structure, such as the binary sphere packing and lattice. The lattice equations may be bounded within the dimensions of an extruded rectangle as specified by the user. The global dimension parameters are specified for diameter and spacing and the height of the extrusion is evaluated against the void 22 diameter and void spacing variables. The relation to the height of the rectangle extrusion was defined for the spheres or voids 22, which are formed inside the extrusion and enable a configurable spacing from the top and side faces of the rectangle.

The relation and spacing of the voids 22 used within the material was based on the X/Y coordinate system relations and by the radius/diameter of the voids 22 or spheres. These relations were applied to the base rectangular, and after the lattice equation relations were established, the spherical lattice was centered within the rectangular configuration. When these relations were established, the spherical lattice used for the radiation shield was deterministic and could be tailored as a packed sphere lattice structure with a given sphere diameter and spacing and within the rectangular tailorable width/height/depth factors.

Figure 11:
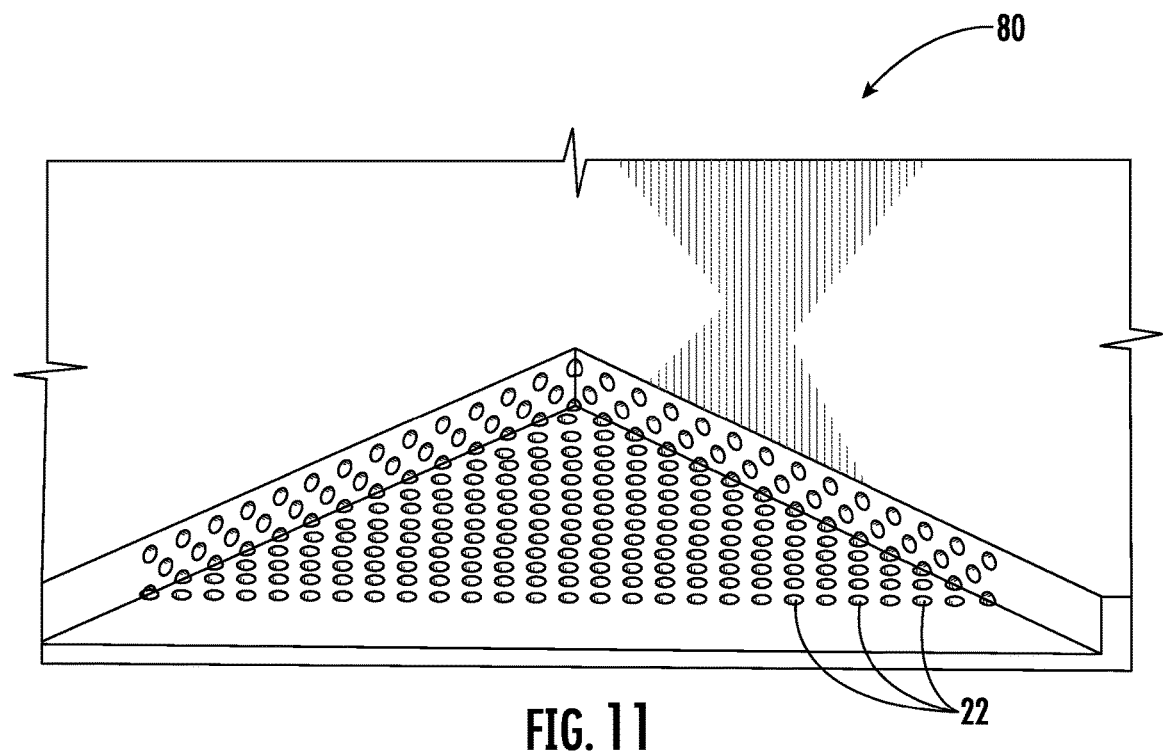
FIG. 11 is a partial sectional view of a radiation shield having three layers of voids and produced using the process as described with fused filament deposition.
Figure 12:
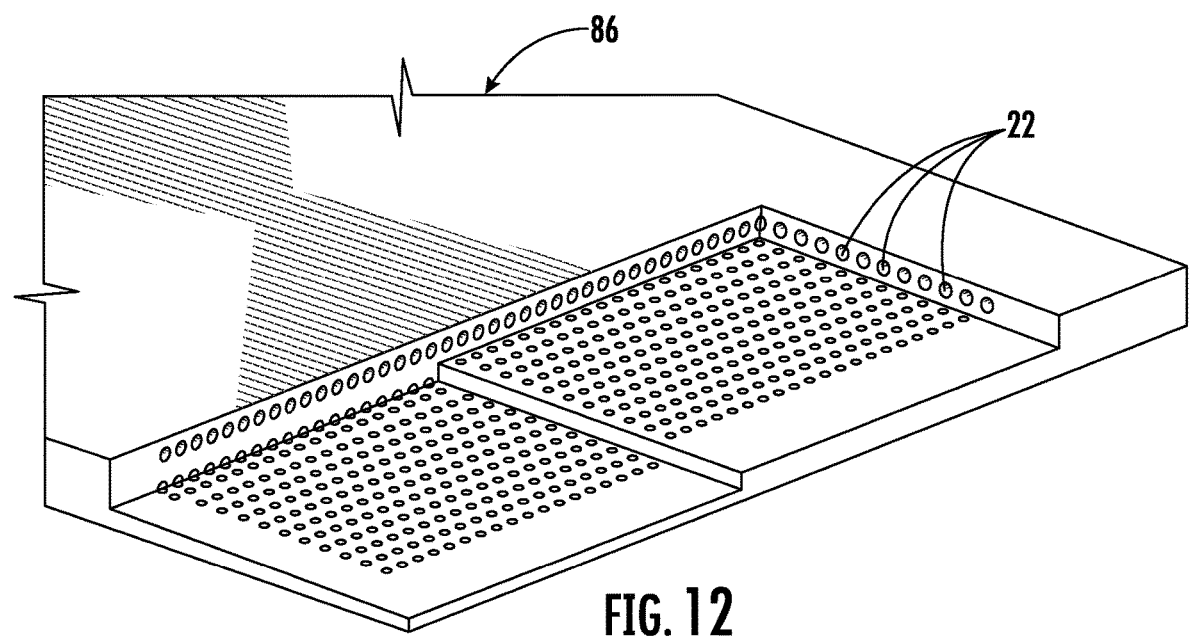
FIG. 12 is another partial sectional view of a radiation shield having two layers of voids similar to that shown in FIG. 11.
Figure 13:
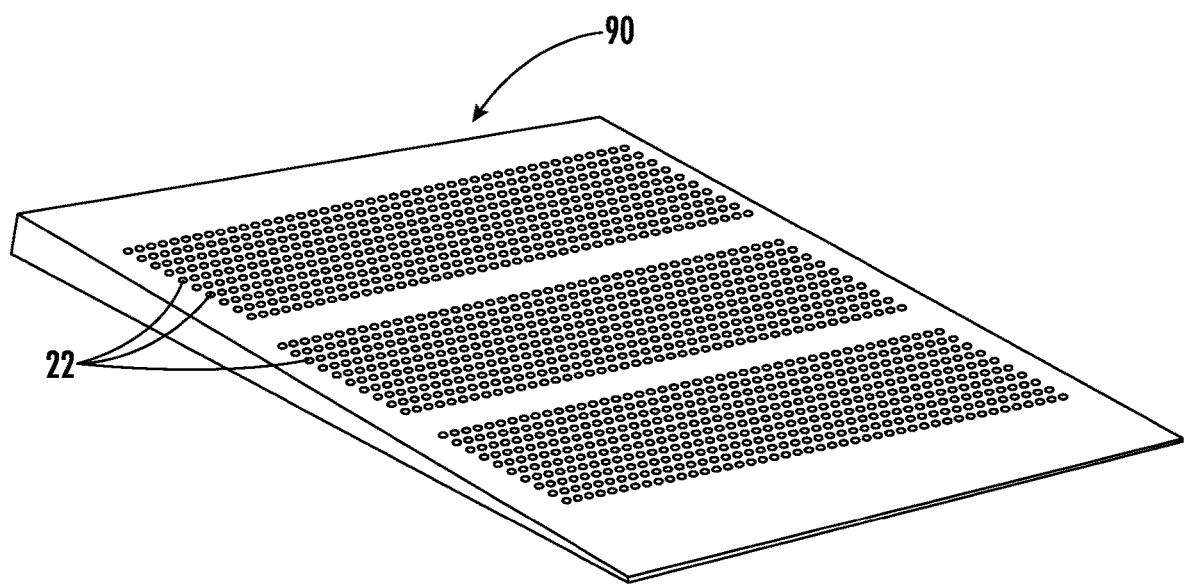
FIG. 13 is another partial sectional view of a radiation shield cut along a diagonal section line.

An example radiation shield produced using this process is shown in FIGS. 11, 12 and 13 and shown at 80 (FIG. 11) as three void 22 layers, and at 86 (FIG. 12) as two void 22 layers, and at 90 (FIG. 13) as multiple void 22 layers that depend on the final thickness, and showing an angled cut-away view. The specific steps for creating a cluster radiation shield 16 as a two-layer configuration in the PTC CREO CAD program is now described as a non-limiting example, such as shown by the example of FIG. 12.

In this example used to produce the radiation shield 16, the mathematical relations were implemented in the Computer Aided Design (CAD) program PTC CREO. The composite metal foam (CMF) radiation shield 16 manufacturing process leverages basic lattice geometry and the lattice geometrical or crystal arrangement as "sphere packing." This technique implemented geometrical, mathematical lattice structure equations for spacing of the spheres in the lattice structure. An example of spheres in a lattice structure are described by a binary sphere packing and lattice (group). Other lattice group structures may be used.

The lattice structural equations may be bound within the dimensions of an extruded rectangle, e.g., a six-sided rectangle or box. The dimensions may be specified by the user depending on the size and configuration of the radiation shield 16 to be produced. The global dimension parameters may be specified for the sphere diameter and spacing. The height of the rectangular extrusion may be evaluated against the sphere or void 22 diameter and the void spacing variables. A relation to the height of the rectangular extrusion is defined for the spheres or voids 22 that will be formed inside of the extrusion, enabling a configurable spacing from the top and side faces of the rectangular extrusion.

The spacing and relation among the voids 22 to be formed within the material chosen to be extruded and form the metal body 20 of the radiation shield 16 is defined based on the relations of the X/Y coordinate system and by the radius/diameter of the spheres or voids 22. The relations, such as spacing of voids 22 and their size and lattice configuration, are applied to the base rectangular extrusion. After the lattice equation relations for the lattice configuration are established, the lattice structure for the voids 22 is centered within the rectangular extrusion.

When all of the relations are established, the spherical lattice used for radiation shielding is deterministic and can be tailored as a packed sphere lattice structure with a given sphere or void diameter (D) and given sphere or void spacing (S) within a rectangular of tailorable width/height/depth.

An example of the different steps using the example CAD program, such as the PTC CREO CAD program, to create a 3D model 19 and produce the radiation shield 16, such as a two-layer radiation shield as shown in FIG. 12, are described as a non-limiting example. The steps may proceed as follows:

1. Determine the overall profile length and width of the object or metal body 20 to be extruded or formed, including clearance for through holes for fasteners.
2. Determine the clearance the metal body 20 as radiation shield 16 will need on all sides for fasteners.
3. Create a sketch rectangle of the needed size for the metal body 20 forming the radiation shield 16, excluding the clearance for the fasteners.
4. Create two global parameters in PTC CREO program termed "D" and "S" (diameter and spacing respectively).
   a. Select the "restrict box" on these parameters from the PTC CREO program. In other programs, other selections may be made to give similar function.
   b. In the pop-up window, select the series tab.
   c. Set the parameter units to length.
5. Extrude the sketched square a reasonable length (this will change in the next step) and exit the extrude.
6. Define the height of the extrusion relative to the diameter and spacing of the voids 22:
   a. Left click on the extrusion in the model tree;
   b. Select edit dimensions then click on the height dimension of the extrude;
   c. Record the dimension number down (dXX) on a sheet of paper and exit "edit dimensions";
   d. Open the global relations (located in the top task bar);
   e. Type: dXX=(½)*sqrt(2)*(D+S))+D where dXX is your dimension number from part c; and
   f. Exit relations and regenerate your model.
7. Add the relation script for centering the spheres or voids 22 inside the extrusion:
   a. Note, when dealing with various diameters and spacing of spheres or voids, it is desirable to be able to have them centered left/right and front/back in the component. This following steps will achieve that:
   b. Open the global relations; and
   c. Copy and paste the below script into the relations pane (DO NOT DELETE THE RELATION FROM 6e).

$n=d12/(D+S)$ $decimal=n-floor(n)$ $y=min(decimal, 0.6666)$ $r=n$ $nn=if(y==decimal, floor(r), ceil(r))$ $x=d12-((nn*D)+((nn-1)*S))$.

8. Create a plane parallel and offset into a side face of the extrusion and exit the plane.
9. Edit dimensions on the plane to record the dimension number (dXX) and exit.
10. In the global relations type below the script:

$dXX=(D/2)+(x/2)$.

11. Close the relations window and regenerate the model.
12. Select the plane that was created in step 8 and start a sketch:
    a. Create a circle inside the extrusion that is tangent to the bottom wall only (i.e., not touching any other walls or with any other constraints);
    b. If the auto dimension for the diameter of the circle is set as a radius, change it to be a diameter;
    c. Select the diameter dimension to edit it, type in "D", select yes to add this relation;
    d. Dimension the center of the circle to the left wall of the extrusion;

i. Set this dimension as "(D/2)+(x/2)" and select yes to add the relation;
e. Sketch a line through the center of the circle starting and ending on the bounds of the circle;
f. Trim the top half of the circle to create a semi-circle (do not trim the side that is tangent to the bottom wall); and
g. Exit the sketch.
13. Select the sketch in the model tree, then select "Revolve":
    a. Ensure that material is being removed and the sketch is revolving around the diameter of the semi-circle creating a sphere; and
    b. Exit the revolve.
14. Start two new separate sketches on perpendicular walls of the extrusion (choose the sides that the sphere is nearest to):
    a. Draw a horizontal line connecting the entire width of the extrusion; and
    b. Dimension these lines as "D/2" from the bottom face (so that it intersects the center of the sphere).
15. Left click on the sphere in the model tree and select "pattern":
    a. On the drop-down menu, select "fill";
    b. Select one of the sketches that was made in step 14; and
    c. Exit the pattern.
16. Left click on the pattern from step 15 in the model tree and select "pattern":
    a. On the drop-down menu, select "fill";
    b. Select the other sketch that was made in step 14 but didn't select in step 15; and
    c. Exit the pattern.
17. Create a new plane going diagonally through the extrusion that intersects the sketch from step 12:
    a. This plane goes from far corner to far corner of the extrusion.
18. Start a new sketch on the plane that was created in step 17:
    a. Ensure that the sketch from step 12 is visible;
    b. Create a circle inside the extrusion that is tangent to the top wall only (i.e., not touching any other walls or with any other constraints);
    c. If the auto dimension for the diameter of the circle is set as a radius, change it to be a diameter;
    d. Select the diameter dimension to edit it, type in "D", select yes to add this relation;
    e. Dimension the center of the circle that was just sketched to the center of the sketch from step 12:
        i. Ensure that the dimension is marked as the true distance between the circles (not the horizontal or vertical distance between them); and
        ii. Set this dimension as "D+S" and select yes to add relation;
    f. Sketch a line through the center of the circle starting and ending on the bounds of the circle;
g. Trim the bottom half of the circle to create a semi-circle (do not trim the side that is tangent to the top wall); and
h. Exit the sketch.
19. Select the sketch in the model tree, then select "Revolve":
    a. Ensure that material is being removed and the sketch is revolving around the diameter of the semi-circle creating a sphere; and
    b. Exit the revolve.
20. Start two new separate sketches, on perpendicular walls of the extrusion (choose the sides that the sphere is nearest to):
    a. Draw a horizontal line along the width of the extrusion;
        i. Dimension each end of the line as "X/2" away from the wall; and
        ii. NOTE: the line should be shorter than the width of the extrusion, not longer; and
    b. Dimension these lines as "D/2" from the top face (so that it intersects the center of the sphere from steps 18 and 19).
21. Left click on the sphere from step 19 in the model tree and select "pattern":
    a. On the drop-down menu, select "fill";
    b. Select one of the sketches that was made in step 20; and
    c. Exit the pattern.
22. Left click on the pattern from step 21 in the model tree and select "pattern";
    a. On the drop-down menu, select "fill";
    b. Select the other sketch that was made in step 20 but did not select in step 21; and
    c. Exit the pattern.
23. Select the bottom face of the extrusion and start a sketch:
    a. Sketch a rectangle that is the same size and overlaps the rectangle from step 3;
    b. Sketch another rectangle that is larger than the one from 23a;
    c. Dimension this rectangle relative to the one in 23a and set the distance between them to be the length wanted for clearance of fasteners; and
    d. Exit sketch.
24. Extrude the sketch from step 23:
    a. Select "up to surface" from the drop-down menu;
    b. Select the top surface; and
    c. Exit the extrude.
25. Start a new sketch on the top face of the extrude:
    a. Sketch a rectangle that matches and overlaps the entire profile of the part; and
    b. Exit sketch.
26. Extrude the sketch from step 25:
    a. Type in the dimension that is desired for clearance on top of the part; and
    b. Exit extrude.
27. Start a new sketch on the bottom face of the extrude:
    a. Sketch a rectangle that matches and overlaps the entire profile of the part; and
    b. Exit sketch.
28. Extrude the sketch from step 25:
    a. Type in the dimension that is desired for clearance on bottom of the part; and
    b. Exit extrude.

FIGS. 11-13 show the rendered images of a final radiation shield showing portions of the radiation shield in different embodiments. FIG. 11 shows the rectangular plate 80 as a radiation shield 16 for the metal body 20 that includes the pattern of spherically shaped voids 22 throughout the metal body 20 in this section that operates as the radiation shield 16. As evident in this three void layer, the outer peripheral portions do not include the spherically shaped voids 22 and this radiation shield 80 could be used as a bracket. A similar design is shown in the partial cut-away view of the plate 86 in FIG. 12 and another tapered view of a plate 90 as a diagonal cut-away is shown in FIG. 13. The different layers are illustrated and show the rows of spherically shaped voids 22.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method for making a radiation shield comprising:
generating within a processor a three-dimensional (3D) model for a metal body to serve as a radiation shield based upon a predetermined radiation stopping thickness for the metal and a predetermined strength based upon the metal and a pattern of spherically shaped voids therein, the 3D model being generated within the processor by,
inputting values for a) the radiation environment and radiation tolerance levels for any electronic components and circuits to be protected, b) the dimensional values of the radiation shield to be made, and c) the radiation dose rates for a given period of time in the space environment to which the radiation shield will be subjected; and
based upon the inputted values, calculating for the radiation shield a radiation shielding thickness and material having successive sphere void layers and a sphere void spacing, size and lattice configuration in successive layers where the radius of a sphere wall to the outer diameter of the sphere is constant, and applying the radiation shielding thickness and sphere void spacing, size and lattice configuration in the radiation shield to an extrusion pattern; and
performing fused filament deposition based upon the extrusion pattern to create the metal body having the pattern of spherically shaped voids throughout the metal body in a first section that operates as the radiation shield by extruding an extrusion material in successive layers to produce spherically shaped voids having a predefined size, spacing and density and the pattern of the spherically shaped voids relative to the thickness of the extrusion material to impart the predetermined radiation stopping thickness and predetermined strength.

2. The method of claim 1, wherein the pattern of spherically shaped voids is in a repeating pattern.

3. The method of claim 1, wherein the pattern of spherically shaped voids is in a random pattern.

4. The method of claim 1, wherein the spherically shaped voids have a spherical shape with a same size.

5. The method of claim 1, wherein the spherically shaped voids have diameters in a range of 0.1 to 5 mm.

6. The method of claim 1, wherein the predetermined strength comprises a predetermined bending strength.

7. The method of claim 1, wherein the metal body comprises at least one of steel, aluminum, titanium, vanadium and tungsten.

8. The method of claim 1, wherein the metal body is devoid of lead.

9. The method of claim 1, wherein the metal body includes a second section having fewer spherically shaped voids than the first section and operates as a structural support to the radiation shield.

10. A method for making a radiation shield comprising:
generating within a processor a three-dimensional (3D) model for a metal body to serve as a radiation shield based upon a predetermined radiation stopping thickness for the metal and a predetermined strength based upon the metal and a random pattern of spherically shaped voids therein, the 3D model being generated within the processor by,
inputting values for a) the radiation environment and radiation tolerance levels for any electronic components and circuits to be protected, b) the dimensional values of the radiation shield to be made, and c) the radiation dose rates for a given period of time in the space environment to which the radiation shield will be subjected; and
based upon the inputted values, calculating for the radiation shield a radiation shielding thickness and material having successive sphere void layers and a sphere void spacing, size and lattice configuration in successive layers where the radius of a sphere wall to the outer diameter of the sphere is constant, and applying the radiation shielding thickness and sphere void spacing, size and lattice configuration in the radiation shield to an extrusion pattern; and
performing fused filament deposition based upon the extrusion pattern to create the metal body having the random pattern of spherically shaped voids throughout the metal body in a first section that operates as the radiation shield by extruding an extrusion material in successive layers to produce spherically shaped voids having a predefined size, spacing and density and the random pattern of the spherically shaped voids relative to the thickness of the extrusion material to impart the predetermined radiation stopping thickness and predetermined strength.

11. The method of claim 10, wherein the spherically shaped voids have a spherical shape with a same size.

12. The method of claim 10, wherein the spherically shaped voids have diameters in a range of 0.1 to 5 mm.

13. The method of claim 10, wherein the predetermined strength comprises a predetermined bending strength.

14. The method of claim 10, wherein the metal body comprises at least one of steel, aluminum, titanium, vanadium and tungsten.

15. The method of claim 10, wherein the metal body is devoid of lead.

16. The method of claim 10, wherein the metal body includes a second section having fewer spherically shaped voids than the first section and operates as a structural support to the radiation shield.

17. A method for making a radiation shield comprising:
generating within a processor a three-dimensional (3D) model for a metal body to serve as a radiation shield based upon a predetermined radiation stopping thickness for the metal and a predetermined strength based upon the metal and a repeating pattern of spherically shape voids therein, the 3D model being generated within the processor by,
inputting values for a) the radiation environment and radiation tolerance levels for any electronic components and circuits to be protected, b) the dimensional values of the radiation shield to be made, and c) the radiation dose rates for a given period of time in the space environment to which the radiation shield will be subjected; and
based upon the inputted values, calculating for the radiation shield a radiation shielding thickness and material having successive sphere void layers and a sphere void spacing, size and lattice configuration in successive layers where the radius of a sphere wall to the outer diameter of the sphere is constant, and applying the radiation shielding thickness and sphere void spacing, size and lattice configuration in the radiation shield to an extrusion pattern; and performing fused filament deposition based upon the extrusion pattern to create the metal body having the repeating pattern of spherically shaped voids throughout the metal body in a first section that operates as the radiation shield by extruding an extrusion material in successive layers to produce spherically shaped voids having a predefined size, spacing and density and the repeating pattern of the spherically shaped voids relative to the thickness of the extrusion material to impart the predetermined radiation stopping thickness and predetermined strength.

18. The method of claim 17, wherein the spherically shaped voids have a spherical shape with a same size.

19. The method of claim 17, wherein the spherically shaped voids have diameters in a range of 0.1 to 5 mm.

20. The method of claim 17, wherein the predetermined strength comprises a predetermined bending strength.

21. The method of claim 17, wherein the metal body comprises at least one of steel, aluminum, titanium, vanadium and tungsten.

22. The method of claim 17, wherein the metal body is devoid of lead.

23. The method of claim 17, wherein the metal body includes a second section having fewer spherically shaped voids than the first section and operates as a structural support to the radiation shield.

* * * * *